Patented July 11, 1950

2,514,637

UNITED STATES PATENT OFFICE 2,514,637

CEMENT COMPOSITIONS

Herbert Goldstein, Elizabeth, N. J., assignor to L. Sonneborn Sons, Inc., a corporation of Delaware No Drawing. Application April 29, 1949,
Serial No. 90,540

4 Claims. (Cl. 260—29.6)

This invention relates to new and useful improvements in cement compositions and is a continuation in part of my application Serial No. 622,935, filed October 17, 1945, now abandoned.

Cement or concrete laying or surfacing requires a base of suitable roughness and undercuts in order to securely lock or anchor the cement or concrete thereto applied. When laying cement or concrete on a surface that is relatively smooth, as for instance, a stone, stone composition, cement or concrete, or other masonry surface, it is necessary to precondition that surface by suitably roughening the same. This roughening may be carried out by mechanical means such as chiseling or chipping the surface in a manner to provide the requisite roughness with a maximum of undercuts. This procedure is unsatisfactory, does not give in all cases the desired degree of bond and is uneconomical and time consuming. The results are particularly unsatisfactory when the cement or concrete laid on the base surface possesses different characteristics of heat expansion and cold contraction from that of the base material.

The difficulties involved in obtaining a satisfactory bond between a base surface and the cement or concrete to be laid thereon are particularly pronounced in patch or repair work or resurfacing of a previously existing cement or concrete surface. In those cases, the preconditioning of the old cement or concrete base in the requisite manner for satisfactory bonding of the newly to be laid cement or concrete is difficult, and in the majority of cases will not give satisfactory results. This is especially true where the job is subject and exposed to the exigencies of climatic and weather influences.

Attempts have been made to overcome some of the difficulties of the surface preparation involving the mechanical roughening and undercutting of the base surface by the use of a primer which itself possesses some bonding characteristics with respect to the base surface and after application would set on the base with an exposed surface exhibiting a certain amount of roughness. However, such primer applications are in the majority of cases not too successful as either the bond between primer and bases or the bond between superimposed cement or concrete and primer or both of these prove of insufficient anchorage for the laid cement or concrete to the base onto which it is applied.

Attempts have also been made to compound asphalt into cement compositions for the purpose of thereby obtaining a suitable patching compound. However, such compositions are also not self-bonding and require a suitable asphalt primer. These compositions are furthermore objectionable due to the dark color imparted to the mixture by the asphalt.

One object of the invention is a cement composition which is inherently substantially self-bonding to any substantially self-sustaining base surface to which it is applied without the necessity of preconditioning the base surface or the use of a primer thereon.

A further object of the invention is such a cement composition inherently so self-bonding to an extent that temperature changes differentially affecting the material of the base and the concrete composition in accordance with the invention laid onto the same will not sever the bond.

A still further object of the invention is such a cement composition specifically adapted for patching or resurfacing of worn concrete surfaces without the necessity of pre-roughening the existing concrete surface or applying a primer thereto.

These and still further objects of the invention will appear from the following description.

The Portland cement composition in accordance with the invention essentially comprises a Portland cement composition and intimately dispersed therethrough an aqueous colloidal dispersion of cumaron resin, said aqueous dispersion not containing substantially in excess of 50% by weight of the cumaron resin.

For best results, the amount of cumaron resin in the cement composition in accordance with my invention should be such that there is present about one part by dry weight of cumaron resin for about every 15–50 and preferably about every 40–50 parts by dry weight of Portland cement.

Aqueous colloidal dispersions of cumaron resin frequently referred to as cumaron emulsions may be prepared in accordance with well known procedures and are commercially available with cumaron resins of varying melting points. The melting point of the cumaron resin when used in accordance with the invention determines to some extent the final characteristics of the Portland cement composition after it has been laid and set. The lower the relative melting point of the cumaron resin the relatively softer and more resilient will be the ultimate cement composition after setting. Such relatively low melting point cumaron resin cement composition, however, does not possess the same compressive strength as such cement composition using a cumaron resin of a relatively higher melting point. Such latter cement composition will be, on the other hand, harder than the product containing the cumaron resin of lower melting point. It is thus possible to vary the characteristics of the finally desired cement composition in accordance with specific demands or requirements. I have found, however, that a cumaron resin having a melting point lower than substantially 35° C. will not produce a satisfactory Portland cement composition as the resulting product exhibits too high a degree of softness. On the other hand, I have discovered that a cumaron resin having a melting point in excess of substantially 55° C. will not yield a satisfactory Portland cement composition because the resulting surface after setting will lack that degree of resiliency normally required of cement and concrete compositions if they are to be resistant to fracture and the impact of heavy traffic. Thus, within the preferred embodiment of my invention, I find it of advantage to use a cumaron resin of a melting point substantially from 35 to 55° C.

Aqueous dispersions of cumaron in excess of 50% cumaron resin content are not desirable as they are relatively so viscous that they cannot be satisfactorily mixed with the cement and/or other aggregate due to the danger of coalescence of the cumaron particles. The cumaron resin may be incorporated by adding the same to the cement or to the gauging water or to the aggregate, or to a mixture of any or all of these substances making up the cement composition.

The terms "cement," "cement composition" or such similar expressions as herein used are intended to designate any Portland cement composition whether neat, i. e., without the addition of sand and/or aggregate, or in the form of a concrete or similar composition, i. e., one containing sand and/or aggregate.

If desired, it is possible to satisfactorily incorporate in the cement composition or material in accordance with the invention, asbestos or other suitable fibrous material either as such or saturated with the emulsion or dispersion of the cumaron resin to thereby obtain a cement material or product which can be used in sheet or other unit form for building construction and similar purposes, and which can be nailed, sawn, drilled or otherwise worked.

The water introduced with the cumaron resin emulsion or dispersion should be taken into account in the determination of the gauge water for the preparation of the final cement or concrete mix. In a limiting case therefore the minimum water content of the cumaron resin emulsion or dispersion is defined by the total amount of gauging water required for the particular cement or concrete composition, in which event all of such gauging water would thus be introduced by weight of the water content of the aqueous cumaron emulsion or dispersion.

The following examples are furnished by way of illustration and not of limitation:

*Example I*

Neat Portland cement was gauged with water to plastic consistency in the proportion of about 10 pounds of Portland cement to five pounds of water. The mixture was applied to a previously mechanically roughened concrete surface to a thickness of ½". After the mix had hardened, no uniform overall anchorage was discernible and the absence of a real bond was manifest when a ten pound weight was dropped on the surface, whereupon the topping fractured.

*Example II*

A mixture of Portland cement-sand and stone, in the proportion of one bag of cement (about 94 lbs.), two bags of sand (about 275 lbs.) and about 300 lbs. of stone and water to give a water-cement ratio of 0.55 by weight (about 52 lbs.) was applied to a concrete base, which had been mechanically roughened, to a thickness of 1½". Examination of this application after one week showed that adhesion was by mechanical anchorage alone and that the topping was held in place by its own weight. Impact of a ten pound weight dropped from a height of six feet fractured the topping and upon removal of the fractured fragment, no positive bond between the topping and the sub-surface was discerned.

*Example III*

Portland cement (about 94 lbs.) was gauged with water (about 52 lbs.) to plastic consistency, the water carrying in dispersion 1½ parts of cumaron emulsion by volume (about 6 lbs. dry weight cumaron resin). The plastic mixture was applied to a plane concrete surface, omitting any previous preparation, to a thickness of ½". Inspection of this application after seven days showed firm adhesion throughout and the impact of a ten pound weight dropped from a height of six feet, indented but failed to fracture the topping. Tests for soundness indicated a permanent bond throughout.

*Example IV*

A Portland cement concrete mix was made up in accordance with Example II with the exception that ½ part of cumaron emulsion by volume (about 2 lbs. by weight of resin) was dispersed in the gauging water. The mix was applied on a straight concrete base without any previous preparation thereof, to a thickness of 1½". Upon testing substantially as in the previous examples, a uniform permanent bond was evidenced throughout.

In the following examples, applications of the cement composition in accordance with the invention, such as for the laying of entire surfaces or for the patch work of worn surfaces, are described by way of illustration:

*Example V*

An interior concrete floor in a laboratory building which had been badly worn by traffic was re-surfaced in accordance with the following procedure: A mix comprising one bag Portland cement (about 94 lbs.), two bags sand (about 275 lbs.), about 4 lbs. of 50% cumaron emulsion (about 2 lbs. per dry weight cumaron resin) was gauged with sufficient water to give a plastic workable mix and the mix was spread over the floor and screeded to a level surface. The thickness of the topping ranged from 1" to ¼" depending on the depth of the worn areas, holes and ruts in the floor. The edges of the area were feathered down to the level of the adjacent sound flooring. The topping was allowed to set for two hours and then steel troweled to a smooth surface. Twenty-four hours later the surface was inspected and it was seen that a uniform positive bond existed throughout between the topping and the base. Inspection after the re-surfaced area had been in use for six weeks, during which period it had been subjected to rolling ambulatory traffic, revealed only a number of random hairline cracks at the feathered edge perimeter of the re-surfaced area, but no fractures or evidence of loss of bond throughout.

*Example VI*

An outdoor concrete stairway sustained severe damage by way of spalling and cracking due to frost. Treads were spalled to a depth of ¾ of an inch and the risers exhibited numerous cracks. The vertical side walls were spalled to a depth of 1/16".

A mixture of one bag cement (about 94 lbs.), about 4 lbs. of 50% cumaron emulsion and two bags sand (about 275 lbs.) was gauged with sufficient water to give a plastic mix (about 50 lbs. water). The mix was then troweled over all the spalled and broken risers so that the new and old surface formed a continuous level. Within twenty-four hours, all patched areas were hard and the treads in shape to receive traffic. Inspection six weeks later revealed no sign of disruption of bond.

The foregoing description is for purposes of illustration and not of limitation and it is therefore my intention that the invention be limited only by the appended claims or their equivalents wherein I have endeavored to claim broadly all inherent novelty.

I claim:

1. A substantially self-bonding cement composition comprising a Portland cement composition and intimately dispersed therethrough an aqueous colloidal dispersion of not in excess of substantially 50% by weight of cumaron resin, said cumaron resin being present to substantially yield about one part by dry weight of cumaron resin for about every 15–50 parts by dry weight of Portland cement present in said composition, the water in said dispersion not substantially exceeding the total gauging water required for said composition.

2. A substantially self-bonding cement composition in accordance with claim 1 in which said cumaron resin is present to substantially yield about one part by dry weight of cumaron resin for about every 40–50 parts by dry weight of Portland cement present in said composition.

3. A substantially self-bonding cement composition in accordance with claim 2 in which said cumaron resin has a melting point substantially between 35 and 55° C.

4. Method of preparing a substantially self-bonding cement composition which comprises intimately dispersing through a Portland cement composition an aqueous colloidal dispersion of not in excess of substantially 50% by weight of cumaron resin having a melting point substantially between 35 and 55° C. and present substantially to yield about one part by dry weight of cumaron resin for about every 15–50 parts by dry weight of Portland cement, the water in said dispersion not substantially exceeding the total gauging water required for said composition.

HERBERT GOLDSTEIN.

REFERENCES CITED

The following references are of record in the file of this patent:

UNITED STATES PATENTS

| Number | Name | Date |
|---|---|---|
| 1,299,798 | Skinner | Apr. 8, 1919 |
| 1,991,007 | Bonney et al. | Feb. 12, 1935 |